US009599528B2

(12) United States Patent
Di Lullo et al.

(10) Patent No.: US 9,599,528 B2
(45) Date of Patent: Mar. 21, 2017

(54) PIPELINE INSPECTION APPARATUS FOR THE INTERNAL INSPECTION OF PIPELINES

(71) Applicant: Eni S.p.A., Rome (IT)

(72) Inventors: Alberto Giulio Di Lullo, Tribiano (IT); Luciano Scaltrito, Chivasso (IT); Marco Pirola, Borgomanero (IT); Jean Marc Tulliani, Turin (IT)

(73) Assignee: ENI S.P.A. (IT)

( * ) Notice: Subject to any disclaimer, the term of this patent is extended or adjusted under 35 U.S.C. 154(b) by 297 days.

(21) Appl. No.: 14/362,744

(22) PCT Filed: Dec. 6, 2012

(86) PCT No.: PCT/IB2012/057031
§ 371 (c)(1),
(2) Date: Jun. 4, 2014

(87) PCT Pub. No.: WO2013/102807
PCT Pub. Date: Jul. 11, 2013

(65) Prior Publication Data
US 2015/0059498 A1  Mar. 5, 2015

(30) Foreign Application Priority Data

Dec. 12, 2011  (IT) ................ MI2011A2239

(51) Int. Cl.
*G01M 3/00*  (2006.01)
*F16L 55/38*  (2006.01)
(Continued)

(52) U.S. Cl.
CPC ............. *G01M 3/005* (2013.01); *F16L 55/38* (2013.01); *F16L 55/40* (2013.01); *G01B 5/00* (2013.01); *G01B 5/12* (2013.01); *F16L 2101/30* (2013.01)

(58) Field of Classification Search
CPC .... G01M 3/005; G01M 3/246; G01M 3/2823; F16L 55/26; F17D 5/00
(Continued)

(56) References Cited

U.S. PATENT DOCUMENTS 3,755,908 A    9/1973  Ver Nooy
4,098,126 A *  7/1978  Howard ............... G01B 5/0002
                                                    33/544.5
(Continued)

FOREIGN PATENT DOCUMENTS

EP   1376048 A1   1/2004
WO   0061305 A2  10/2000
(Continued)

OTHER PUBLICATIONS

International Search Report dated Jul. 12, 2013 for PCT/IB2012/057031.

*Primary Examiner* — David Gray
*Assistant Examiner* — Andrew V Do
(74) *Attorney, Agent, or Firm* — Abel Law Group, LLP

(57) ABSTRACT

An apparatus for determining the conditions of a pipeline and for the analysis of the fluid contained therein comprising: a central body having a substantially cylindrical form perforated for the whole length and comprising at least a salinity sensor and at least a pH measurement sensor; a first crown of petals connected to the central body, wherein each petal extends from the central body until it touches the internal wall of the pipeline and wherein each petal comprises at least one deformation sensor and at least one roughness sensor; a sliding device integrally connected to the central body in a more advanced position with respect to the first crown of petals, wherein the sliding device can be a second crown of petals identical to the first crown of petals or a foam pig suitably perforated. A method is for deter- (Continued)

mining the conditions of a pipeline and for the analysis of the fluid contained therein, which uses the apparatus.

24 Claims, 5 Drawing Sheets

(51) Int. Cl.
 *F16L 55/40*  (2006.01)
 *G01B 5/00*  (2006.01)
 *G01B 5/12*  (2006.01)
 *F16L 101/30*  (2006.01)

(58) Field of Classification Search
 USPC ........................................................ 73/865.8
 See application file for complete search history.

(56) References Cited

U.S. PATENT DOCUMENTS

| | | | |
|---|---|---|---|
| 4,953,412 A | | 9/1990 | Rosenberg et al. |
| 6,450,104 B1* | | 9/2002 | Grant ..................... B08B 9/049 |
| | | | 104/138.1 |
| 2004/0261547 A1* | | 12/2004 | Russell ..................... F17D 5/00 |
| | | | 73/865.8 |
| 2009/0078283 A1* | | 3/2009 | Phipps .................... F16L 55/38 |
| | | | 134/8 |

FOREIGN PATENT DOCUMENTS

| | | |
|---|---|---|
| WO | 2007020438 A2 | 2/2007 |
| WO | 2009133404 A1 | 11/2009 |

\* cited by examiner

PIPELINE INSPECTION APPARATUS FOR THE INTERNAL INSPECTION OF PIPELINES

The present invention relates to an apparatus, and the relative method, for the monitoring and analysis of the conditions of a pipeline and of the fluid contained therein.

More specifically, the present invention relates to a monitoring and analysis method of the conditions of a pipeline with the use of a pipeline inspection gauge, more commonly known as "pig".

The invention relates in particular to a pig capable of reveiling and recording geometrical variations inside a pipeline and the physico-chemical characteristics of the fluid that is flowing inside the same.

The use of pigs is well-known in the state of the art, these devices are used for numerous purposes and normally move inside the pipeline thanks to the pressure or flow present in the same.

Some pigs are equipped with a semi-rigid or foamy structure and have a form similar to a bullet. These pigs, known as "foam pigs", are generally made of polyurethanes or expanded elastomers and are capable of adapting themselves to the internal form of the pipeline. As a result of their capacity of adhering to the inner walls of the pipeline, they are used for removing accumulations of material from the same.

Other types of pigs are used for accurately measuring the internal diameter of the pipeline, in order to reveal and localize the presence of possible obstructions or damage.

Some of these pigs have ends that extend from the body of the device until they touch the internal walls of the pipelines, like fingers. For this reason, in some of the known devices in the state of the art, these ends are called fingers or petals.

Said fingers or petals are in constant and direct contact with the inner walls of the pipeline and, if suitably instrumented, can collect a certain amount of information on the same.

Some examples of this technical solution are illustrated in U.S. Pat. No. 4,953,412 or WO 2007/020438 or WO 2009/133404 which describe systems capable of recording and measuring the movements of the ends or petals when these enter into contact with imperfections or obstructions of the pipeline.

In particular, some pigs are known in the state of the art, which use extensometers for recording the movements of the petals of pigs, accurately measuring the geometrical alterations of the section of pipeline.

An example is patent EP 1376048 which describes an apparatus equipped with extensometers positioned on a series of radiuses of the pig. The trend of the strain of these extensometers is measured and recorded in order to calculate variations in the internal diameter of the pipeline.

A further example consists of patent WO2000/061305 which describes an apparatus for determining the physical conditions of a pipeline, wherein some extensometers are used for detecting deformations of an elastomeric disc integral with the body of the pig.

The use of the above-mentioned systems allows physical information to be obtained on the internal state of the pipeline, but it does not reveal chemical information on the fluid contained in the pipeline itself.

Furthermore, the systems indicated above can have various drawbacks. The possible breakage of the pig or instruments contained in pigs, for example, can cause a dispersion of voluminous and rigid parts in the pipeline. As pigs are almost entirely produced with metallic materials, the dispersion of parts of the pig can cause damage to the pipeline and in any case jeopardize further inspection operations.

In addition to what is indicated above, the Applicant has also discovered the importance of the advance rate of the pig for reaching an optimum quality of the information revealed by the sensors installed therein. When the pig is not equipped with its own propelling means, it is the fluid that provides the pig with the necessary thrust. As the thrust is proportional to the encumbrance of the pig and in particular the surfaces orthogonal to the axis of the pipeline, a pig having a section equal to that of the pipeline will advance at the same rate as the fluid contained therein, viceversa, in the case of a pig with small orthogonal sections with respect to that of the pipeline and pipelines that carry gas, the pig cannot move forward autonomously.

The Applicant has therefore considered the problem of finding an apparatus, i.e. a pipeline inspection gauge, capable of providing reliable data on the conditions of the pipeline and overcoming the drawbacks described above.

The Applicant has now found that the use of an inspection apparatus or pig, equipped with sensors for measuring the physical properties of the pipeline and also equipped with sensors for measuring the chemical properties of the fluid contained therein, allows an understanding of the conditions of the pipeline at the moment of pigging and predicting the future conditions of the same. By continuously registering and storing the information collected by said sensors, it is possible to detect defects and/or anomalies inside the pipeline for its whole length.

The Applicant has also found that by eliminating or minimizing the metallic materials for the structure of the apparatus, in the case of breakage of the same, the pipeline will be exposed to fewer risks of damage during the subsequent pigging operations.

The Applicant has finally found that by installing a suitable system of sails and/or holes on the pig, the thrust exerted by the fluid on the pig can be increased or reduced, by increasing or reducing its advance rate.

An object of the present invention relates to an apparatus for determining the conditions of a pipeline as specified in claim 1.

Further characteristics of the apparatus for determining the conditions of a pipeline are the object of the dependent claims.

A further object of the present invention relates to a method for determining the conditions of a pipeline.

BRIEF DESCRIPTION OF THE DRAWINGS

The characteristics and advantages of the apparatus for determining the conditions of a pipeline and the relative method according to the present invention will appear more evident from the following illustrative and non-limiting description, referring to the enclosed schematic drawings in which.

Figure 1A:
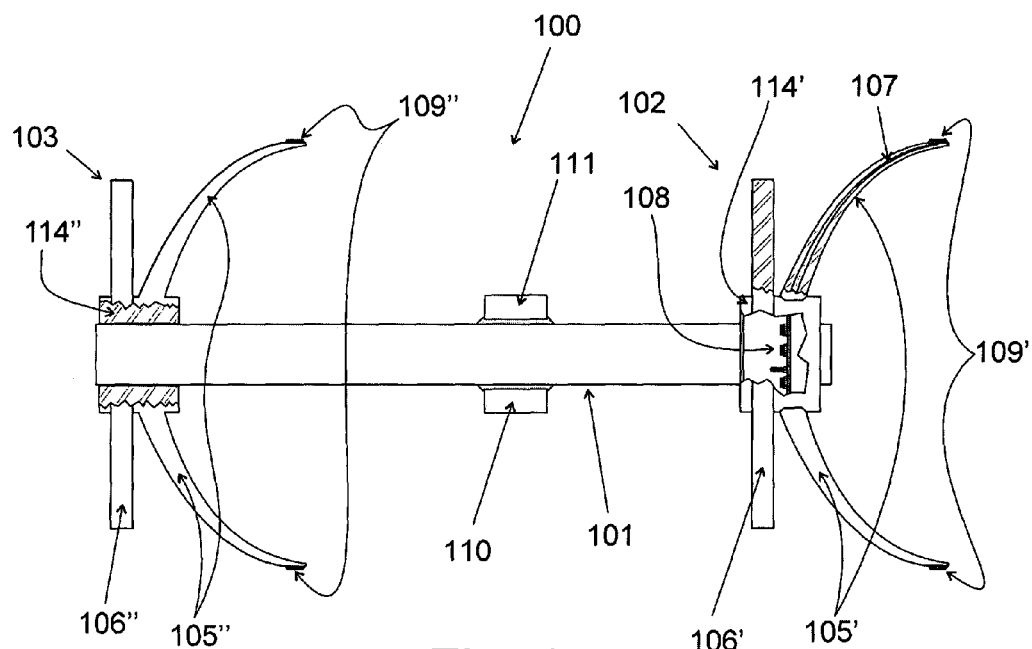
FIG. 1a is a schematic view which shows a preferred embodiment of the apparatus according to the present invention in which there is a first crown of petals positioned on the central body in a rear position with respect to a second crown of petals.
Figure 1B:
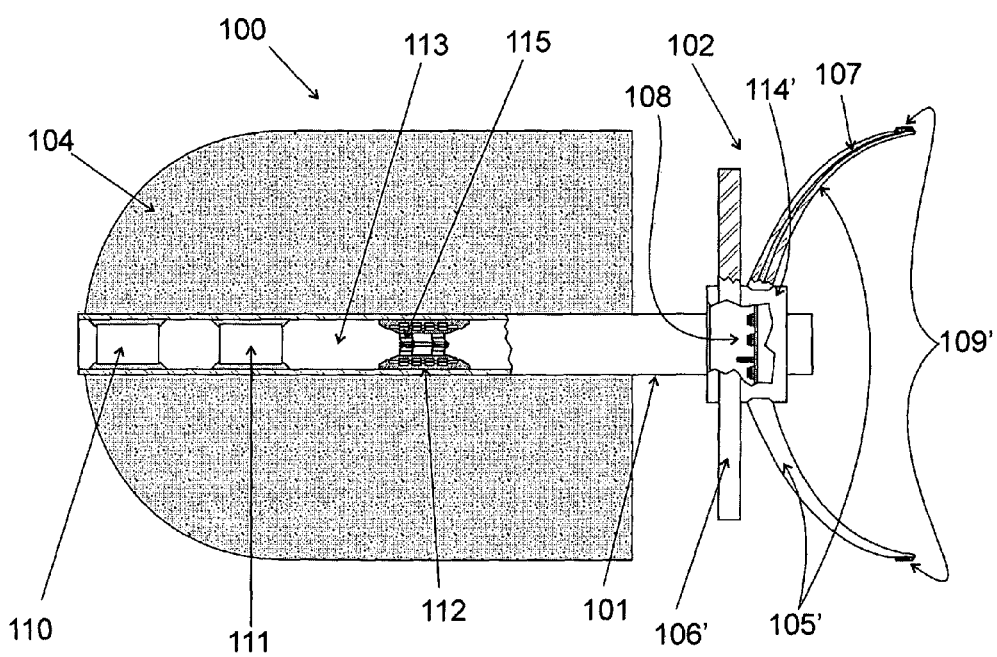
FIG. 1b is a schematic view which shows a further preferred embodiment of the apparatus according to the present invention in which there is a foam pig positioned on the central body in a front position with respect to the first crown of petals.

With reference to the figures, these show an apparatus 100 for determining the conditions of a pipeline 201, wherein said apparatus comprises:

a central body 101, preferably having a cylindrical form, suitable for being inserted into a pipeline 201, prevalently made of plastic material;

a first crown of petals 102 connected to the central body 101, wherein each petal 105' prevalently consists of elastic polymeric material and extends from the central body 101 until it touches the internal wall of the pipeline 201, each petal comprising at least one deformation sensor 107 and at least one roughness sensor 109';

a sliding device 103, 104 which can be connected to the central body 101 in a more advanced position with respect to the first crown 102, having such a form as to guarantee a direct and constant contact with the internal wall of the duct and a substantial alignment of the axis of the apparatus 100 with that of the pipeline 201.

In a preferred embodiment of the present invention, said sliding device can be a second crown of petals 103 having structural characteristics identical to the first crown of petals 102.

In a further preferred embodiment of the present invention, said sliding device can be a foam pig 104 made of elastomeric or expanded polymeric material having a pass-through hole suitable for receiving and connecting the central body 101, wherein the diameter of the foam pig 104 is equal to or greater than the internal diameter of the duct 201.

Alternatively, said sliding device can be a foam pig (not shown) made of elastomeric or expanded polymeric material, without a pass-through hole and comprising anchoring means to the central body 101. In particular, said anchoring means are positioned in the rear part of the foam pig and can include a plate connected to the foam pig and threaded elements for connection to the central body 101.

For the purposes of the present invention, the front part of the apparatus 100 or central body 101 or crowns 102 and 103 or foam pig 104 refers to the part that follows the advance direction of the apparatus in the pipeline 201, whereas the rear part is the opposite part, i.e. that which is contrary to the advance direction of the apparatus 100 in the pipeline 201.

In a preferred embodiment of the present invention, said central body 101 can have a calibrated hole 113 which passes through it for the whole length, having the revolution axis parallel to or coinciding with the axis of the central body 101.

In a preferred embodiment of the present invention, a salinity sensor 110 and a pH-measurement sensor 111 are installed on the central body 101, preferably on the outer face of the same. In an alternative embodiment, said salinity sensor 110 and pH-measurement sensor 111 are installed inside the calibrated hole 113 present in the central body 101.

Said salinity sensor 110 determines the full salinity of the reservoir water present in the pipeline being inspected, determining the content of sulfates in the fluid that is flowing in the pipeline 201.

Said pH-measurement sensor 111 can be a small PVC sheet having an adhesive layer on which specific compounds are deposited, which become chemically modified, preferably dissolved, in relation to the fluid and its chemical characteristics, in particular the pH, which the apparatus encounters as it advances inside the pipeline 201.

Said sheet can be subsequently disconnected from the support that connects it to the central body 101 and analyzed in the laboratory to determine the pH of the water present in the pipeline, whether it be water of a fossil origin or condensate. The laboratory analysis can be carried out with numerous techniques (weighing, X-ray diffractometry, etc.) known in the state of the art.

Alternatively, said salinity sensor 110 and pH-measurement sensor 111 can be electronic and accumulate the information collected in a memory connected to them and positioned inside the apparatus 100 (not shown). At the end of the monitoring operation of the pipeline, said data collected can be recovered through suitable interface means (not shown).

In a preferred embodiment of the present invention, the first crown of petals 102 comprises a base 114' having a substantially cylindrical form perforated in the centre (hub), capable of housing the central body 101 inside the hole and being connected to it by means of threading or another mechanical connection system (not shown).

The electronic conditioning, digitalization, powering, processing and memorization systems 108 of the data collected by said deformation and roughness sensors are housed in said base. The data stored in the memory can be subsequently downloaded for analysis by means of suitable connection systems (not shown) present on the base 114', for example by means of a USB connection port.

In a particular embodiment, the data obtained from the salinity sensors 110 and pH-measurement sensors 111 are collected and stored by said electronic systems 108 present in the first crown of petals 102.

At least three petals 105', preferably six, having a prevalently arched form extend from the base of the crown 102 until they reach and exceed the internal diameter of the pipeline 201, so that, once the apparatus 100 has been inserted in the pipeline 201, a constant contact of the ends of the petals 105' is created with the internal wall of the pipeline 201. As said petals are made of an elastic polymeric material, they remain in contact with the internal wall of the duct also in the presence of deformations 202 of the same, continuously adhering to this.

The deformation sensors 107, which are preferably extensometers adhering to thin metal laminas positioned inside the petals, reveal the deformation of the petals if these encounter an obstacle and transform said deformation into an electric signal variation. The extensometers used as deformation sensors 107 are preferably of the piezoelectric type, capacitive or piezoresistive.

In a particular embodiment of the present invention, when said sliding device is a second crown of petals 103, the second crown of petals 103 can also comprise in each petal 105" at least one deformation sensor (not shown) and at least one roughness sensor 109", installed in the same way as for the first crown of petals 102.

Figure 2A:
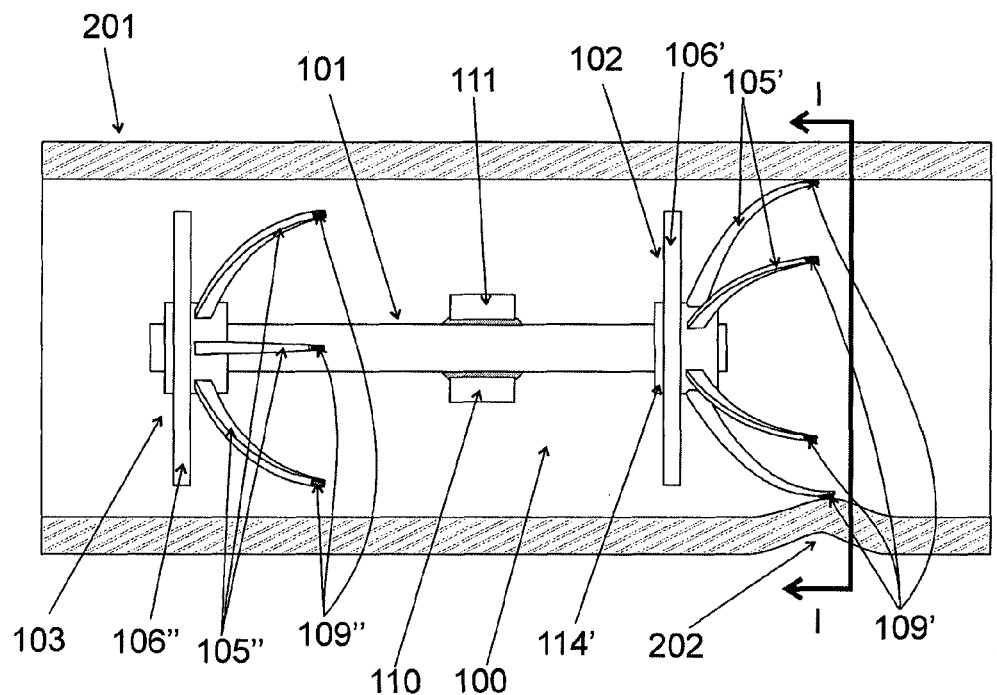
FIG. 2a is a schematic view of an apparatus according to the present invention comprising a first and a second crown of petals shown as it passes inside a pipeline in a sectional view.
Figure 2B:
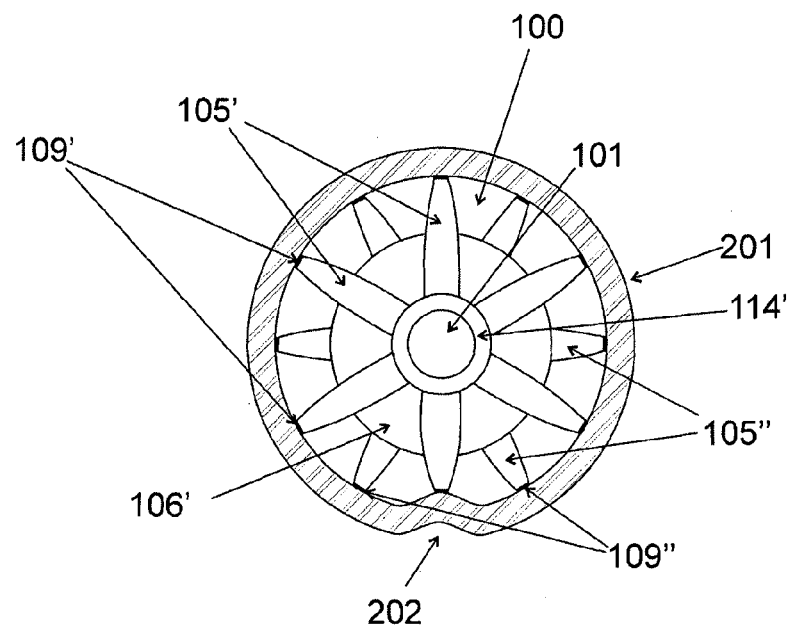
FIG. 2b is a schematic sectional view of what is represented in FIG. 2a according to the section line I-I.

In this particular case, the two crowns of petals 102 and 103 are in an offset position by a few degrees with respect to the axis of the central body 101, as can be seen in FIG. 2b, so that the ends of the petals 105" of the second crown 103 touch the internal circumference of the pipeline 201 in different points with respect to those reached by the petals 105' of the first crown 102.

A circular-shaped wing 106' perforated in the centre, can be constrained to the first crown of petals 102 by means of suitable mechanical means (not shown), and positioned orthogonally with respect to the axis of the apparatus 100.

Said circular-shaped wing 106' allows the thrust of the fluid flowing inside the pipeline 201 to be optimally exploited, increasing the advance rate of the apparatus 100.

Said circular-shaped wing 106' has a diameter smaller than the internal diameter of the pipeline 201, so as to increase the thrust of the apparatus 100 without however removing the accumulations of materials or possible liquids lying in the pipeline 201.

In a particular embodiment of the present invention, said circular-shaped wing 106' can house the electronic conditioning, digitalization, feeding, processing and memorization systems 108 of the data collected by said deformation and roughness sensors and possibly by said salinity sensor 110 and pH measurement sensor 111.

In a particular embodiment of the present invention, a second circular-shaped wing 106", identical to the circular-shaped wing 106", can be constrained to the second crown of petals 103 to further increase, with respect to the solution of the single wing 106', the thrust of the fluid on the apparatus.

In a further particular embodiment of the present invention, said petals of said first and/or second crown of petals 102 and 103 can have an enlarged form to exert greater resistance to the flow of fluid passing in the pipeline 201.

In a preferred embodiment of the present invention, said roughness sensor 109' consists of a probing tip positioned on the end of the petal 105', which is in contact with the internal wall of the pipeline 201. Said probing tip can be connected to the thin metallic lamina provided with extensometers of the deformation sensor 107 to translate the movements of the same into electric signals which, when suitably filtered with a high-pass filter, provide information on the roughness of the pipeline.

In a preferred embodiment of the present invention, said plastic materials or elastic polymeric materials used for producing the central body 101, the first crown of petals 102 and second crown of petals 103, have an average density similar to that of the possible liquid carried in the pipeline 201, preferably lower than or equal to 1.2 g/cm$^3$. For these values, if the apparatus 100 breaks and/or becomes disassembled in the pipeline due to the unexpected presence of obstacles or deformations inside the pipeline 201, it is more probable that the same flow of liquids in the pipeline 201 can carry the components of the apparatus 100 as far as their destination, i.e. as far as the so-called receiving trap. In this way, the information recorded by the acquisition systems can be recovered and interpreted, in order to localize the breakage point of the pig and identify the possible causes, also preventing foreign bodies from being left in the pipeline 201.

Figure 3A:
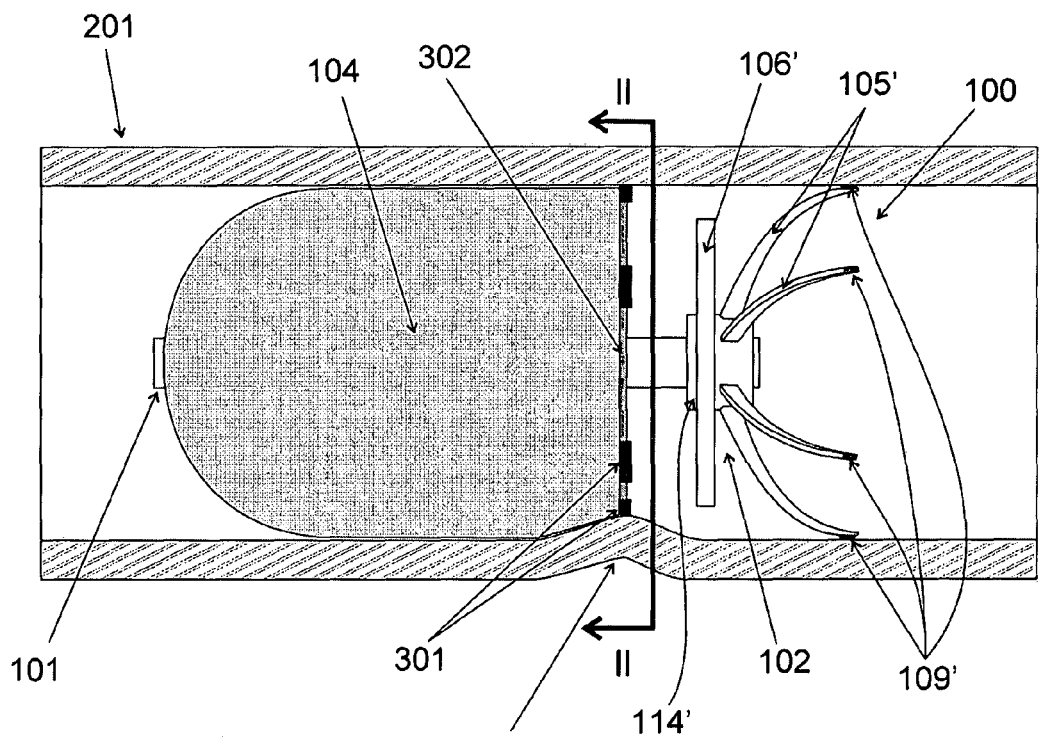
FIG. 3a is a schematic view of an apparatus according to the present invention comprising a first crown of petals and a foam pig shown as it passes inside a pipeline in a sectional view.
Figure 3B:
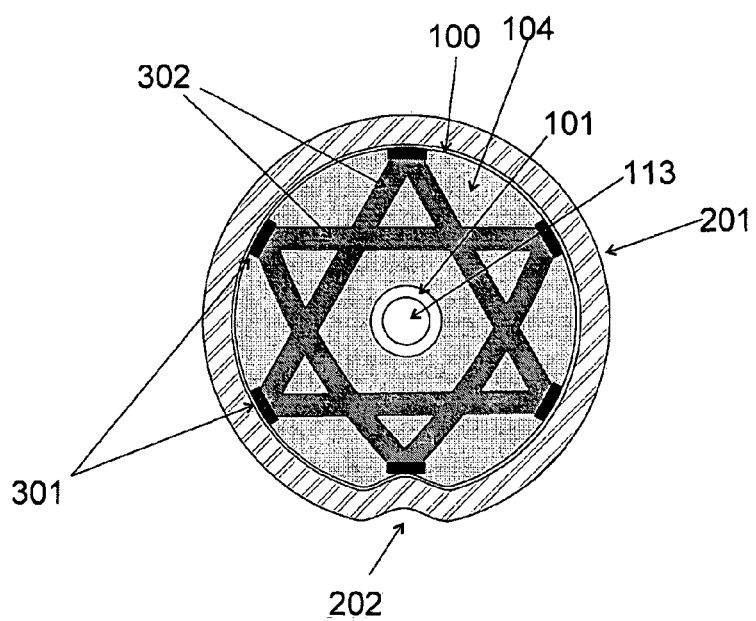
FIG. 3b is a schematic sectional view of what is represented in FIG. 3a according to the section line II-II.
Figure 4:
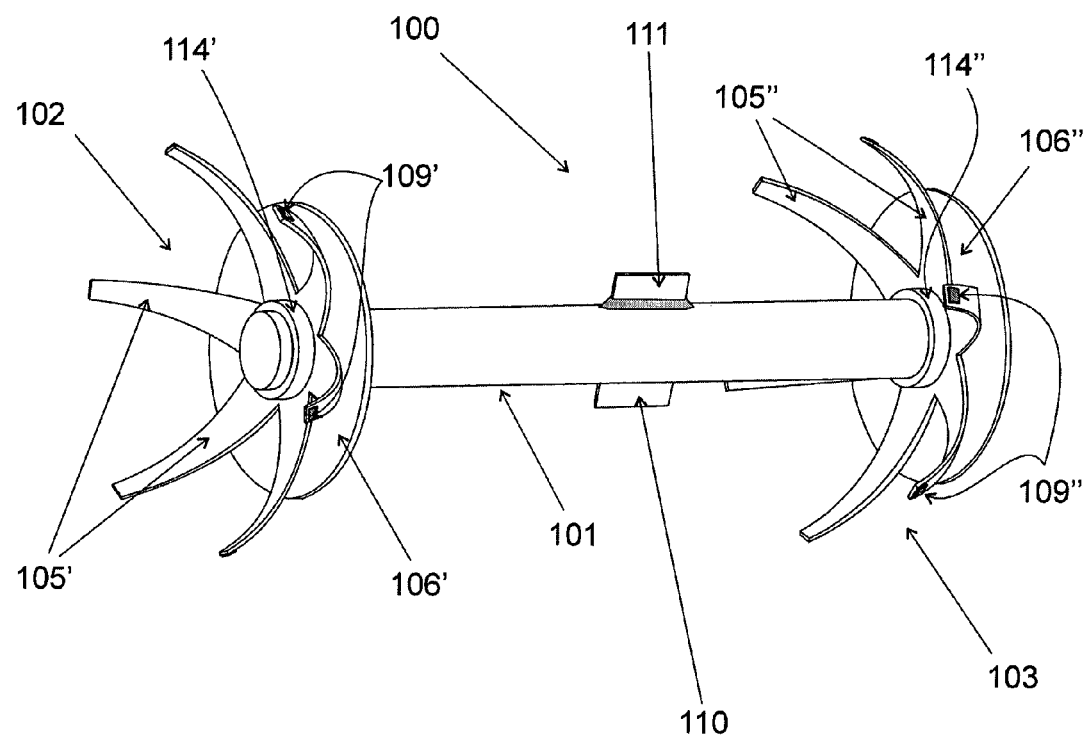
FIG. 4 is a schematic perspective view of an apparatus according to the present invention comprising a first and a second crown of petals.

With particular reference to FIGS. 3a and 3b, as an alternative to the second crown of petals 103, said sliding device can be a foam pig 104 consisting of polymeric or expanded elastomeric material perforated in the centre, installed on the central body 101 in the front with respect to the first crown of petals 102.

Said foam pig 104 is connected to said central body 101 by connection means (not shown) and has a perforated cylindrical form or a perforated bullet form.

By installing a foam pig 104 rather than a second crown of petals 103 on the central body 101, the apparatus not only allows analyses on the pipeline and fluid contained therein, but also removes possible liquid or solid deposits present in the pipeline 201. As the foam pig 104 is made of a polymeric or expanded elastomeric material, it becomes compressed in the presence of restrictions, continuously adapting itself to the internal form of the pipeline 201.

In a particular embodiment of the present invention, said foam pig 104 comprises deformation sensors 302 installed therein.

In a further particular embodiment of the present invention, said foam pig without a pass-through hole (not shown) comprises deformation sensors 302 installed therein.

In particular, said deformation sensors 302 of the foam pig 104 can be flexible strip-like condensers, consisting of a polymeric-type material having in its interior thin non-planar layers of metallic material which increase their capacity when the condenser extends. Said flexible condensers preferably correspond to the characteristics of the model "DEAP" produced by the company Danfoss.

Said deformation sensors 302 are installed on the foam pig 104 in pre-extended mode and fixed to it by supports 301 of plastic material which allow to keep the deformation sensors 302 in tension when the foam pig 104 is not compressed.

Said deformation sensors 302 are installed on the flat rear wall of the foam pig 104 so as not to superimpose the central hole of the foam pig 104.

There are at least two deformation sensors 302, preferably six, in a star arrangement.

In this way, possible compressions of the foam pig 104, due for example to sudden narrowings of the internal diameter of the pipeline 201, can be revealed and measured by said deformation sensors 302.

In a particular embodiment of the present invention, said central body 101 can comprise a shutter (not shown), positioned inside the calibrated hole 113 in a transversal position.

Said shutter of the calibrated hole 113 can restrict the opening span of the hole if electrically stimulated by a control unit (not shown) present in the central body 101.

Said shutter can be a particular type of electric condenser or electroactive polymer which increases or reduces its extension in relation to the current flowing through it.

By enlarging or restricting the opening span of the calibrated hole 113, said shutter increases or reduces the passage of fluid inside the central body 101.

This solution of increasing or reducing the passage of fluid inside the central body 101, allows the thrust of the fluid and consequently the advance rate of the apparatus 100 inside the pipeline 201 to be increased or reduced.

Once the flow-rate of the pipeline 201 and type of fluid passing through it are known, a careful design of the circular-shaped wings 106' and/or 106" and the calibrated hole 113, allow the average rate that the apparatus 100 can have once it has been inserted in the pipeline, to be determined a priori.

Should the monitoring operation of the apparatus 100 in the pipeline 201 require a constant advance rate, the artificial muscle can help to slow down or accelerate the apparatus 100.

In a preferred embodiment of the present invention, said central body comprises at least one pressure sensor positioned in the front part (not shown), at least one pressure sensor positioned in the rear part (not shown) and an accelerometer capable of revealing at each moment the gravitational vertical (not illustrated). These systems allow the rate and acceleration of the apparatus 100 to be established at each moment.

In this particular embodiment of the present invention, said pressure sensors and said accelerometer can be connected to the control unit of the shutter to allow a retroaction of the same shutter, for example by enlarging the opening span of the calibrated hole 113 when the apparatus 100 acquires excessive speed. The entrainment rate of the apparatus 100 ranges from 0.5 m/s to 2 m/s, even more preferably 1 m/s.

In a particular embodiment of the present invention, said central body 101 comprises a temperature sensor (not shown) capable of measuring the temperature of the fluid present in the pipeline 201.

In a particular embodiment of the present invention, said central body 101 of the apparatus 100 can comprise a conversion system of mechanical energy into electric energy 112 in which a turbine 115 is connected to a system of magnets/coils and, while rotating, enables the production of electric current.

Said conversion system of mechanical energy into electric energy 112 is preferably positioned inside the calibrated hole 113, present in the central body 101, and in particular, said turbine 115 can be activated by the fluid passing through the calibrated hole 113.

The electric energy produced by said conversion system of mechanical energy into electric energy 112 can be used for powering all or some of the instruments present onboard the apparatus 100, through energy accumulation' and distribution means installed in the central body 101 (not shown).

In a particular embodiment of the present invention, when said sliding body is a foam pig 104, the apparatus 100 can comprise one or more crowns of petals (not shown) identical to the first crown of petals 102, connected to the central body 101 and in an offset position between each other with respect to the axis of the pipeline 201.

The offset positioning by a few degrees of two or more crowns of petals allows numerous contact points to be created between the various petals and the internal surface of the pipeline 101, thus increasing the mappability of the structural conditions of the pipeline 201.

Figure 5:
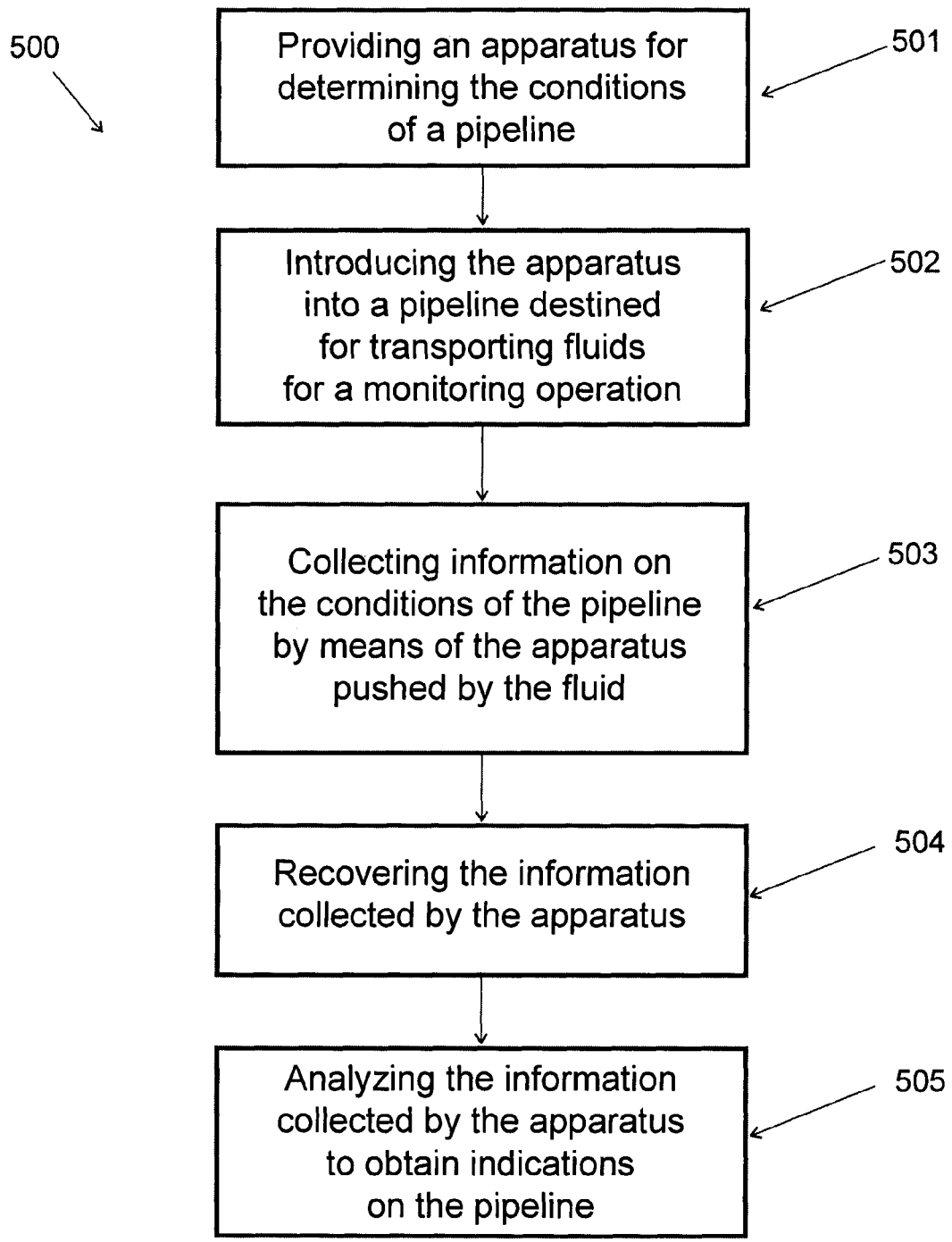
FIG. 5 is a block scheme of the method for determining the conditions of a pipeline according to the present invention.

With particular reference to FIG. 5, this illustrates a further object of the present invention, a method 500 for determining the conditions of a pipeline 201 in which an apparatus 100 in accordance with the present invention (phase 501) is introduced into a pipeline 201 destined for transporting fluids (phase 502) for a monitoring operation during which it collects information on the conditions of the pipeline (phase 503).

Said information on the conditions of the pipeline is collected by the apparatus 100 as it advances inside the pipeline, due to the thrust exerted on the apparatus 100 by the fluid flowing in the pipeline itself.

Once the operation has been completed, the apparatus 100 is extracted from the pipeline 201 in order to recover said information collected by the apparatus during the monitoring operation (phase 504).

This information, after being suitably analyzed (phase 505), provides useful indications on the conditions of the pipeline along the whole monitored path.

In a particular version of the present method 500, when said apparatus 100 comprises said salinity sensors 110 and pH measurement sensors 111, said method enables not only information on the conditions of the pipeline to be collected, but also data on the fluid contained therein, such as for example the pH, salinity and fossil water/condensate dilution ratio. These data can provide useful information for predicting possible corrosion phenomena.

The apparatus and method for determining the conditions of a pipeline according to the present invention thus conceived can in any case undergo numerous modifications and variants, all included in the same inventive concept. The protection scope of the invention is therefore defined by the enclosed claims.

The invention claimed is:

1. An apparatus for determining the conditions of a duct and for the analysis of the fluid contained therein, wherein said apparatus comprises:
    a central body adapted to be inserted into a pipeline, prevalently made of plastic material, comprising a calibrated hole, which passes through it for the whole length, at least a salinity sensor, at least a pH measurement sensor, at least one pressure sensor positioned in a front part, at least one pressure sensor positioned in a rear part and an accelerometer capable of revealing at each moment the gravitational vertical;
    a first crown of petals connected to the central body, wherein each petal prevalently includes elastic polymeric material and extends from the central body until it touches the internal wall of the pipeline, each petal comprising at least one deformation sensor and at least one roughness sensor;
    a sliding device which can be connected to the central body in a more advanced position with respect to the first crown, having such a form as to guarantee a direct and constant contact with the internal wall of the duct and a substantial alignment of the axis of the apparatus with that of the pipeline.

2. The apparatus according to claim 1, wherein said sliding device is a second crown of petals having structural characteristics identical to the first crown of petals, or, otherwise, a foam pig made of an elastomeric or polymeric expanded material suitably perforated for providing accommodation of the central body.

3. The apparatus according to claim 2, wherein, when said sliding device is a second crown of petals each petal of said second crown of petals comprises at least one deformation sensor and at least one roughness sensor.

4. The apparatus according to claim 2, wherein, when said sliding device is a foam pig, said foam pig comprises deformation sensors.

5. The apparatus according to claim 4, wherein said deformation sensors are strip-like flexible condensers installed on the foam pig in pre-extended mode by means of supports.

6. The apparatus according to claim 1, wherein the revolution axis of said calibrated hole which passes through the central body is parallel to or coincident with the axis of the central body.

7. The apparatus according to claim 1, wherein said salinity and pH measurement sensors are of the electronic type and store the collected information in a connected memory positioned within the apparatus.

8. The apparatus according to claim 1, wherein the first crown of petals comprises a base having a substantially cylindrical form perforated in the center and capable of housing the central body inside the hole, wherein the electronic conditioning, digitalization, powering, processing, memorization and connection systems of the data collected by said deformation and roughness sensors and/or said salinity sensor and pH measurement sensor are housed in said base.

9. The apparatus according to claim 8, wherein at least three petals having a prevalently arched form extends from the base of the first crown until they reach and overcame the internal diameter of the pipeline, thus allowing a continuous contact of the ends of the petals with the internal wall of the pipeline.

10. The apparatus according to claim 8 comprising a circular-shaped wing perforated in the center, constrained to the first crown of petals, positioned orthogonally with respect to the axis of the apparatus and having a diameter smaller than the internal diameter of the pipeline, wherein said circular-shaped wing houses the electronic conditioning, digitalization, powering, processing and memorization systems of the data collected by said deformation and roughness sensors and/or said salinity sensor and pH measurement sensor.

11. The apparatus according to claim 1, wherein the deformation sensors are extensometers adhering to thin metal laminas positioned inside the petals.

12. The apparatus according to claim 1, comprising a circular-shaped wing perforated in the center, constrained to the first crown of petals, positioned orthogonally with respect to the axis of the apparatus and having a diameter smaller than the internal diameter of the pipeline.

13. The apparatus according to claim 12, wherein, when said sliding device is a second crown of petals, a second circular-shaped wing, identical to said circular-shaped wing, is constrained to the second crown of petals.

14. The apparatus according to claim 1, wherein the roughness sensor includes a probing tip, positioned on the end of the petal which is in contact with the internal wall of the pipeline.

15. The apparatus according to claim 1, wherein said plastic materials or elastic polymeric materials have an average density lower than or equal to 1.2 g/cm$^3$.

16. The apparatus according to claim 1, wherein said central body comprises a shutter positioned inside the calibrated hole which restricts the opening span of the calibrated hole if electrically stimulated by a control unit present in the central body.

17. The apparatus according to claim 16, wherein said pressure sensors and said accelerometer are connected to the control unit of the shutter to allow a retroaction on the shutter itself.

18. The apparatus according to claim 1, wherein the dragging rate of the apparatus ranges from 0.5 m/s to 2 m/s.

19. The apparatus according to claim 1, wherein said central body comprises a temperature sensor capable of measuring the temperature of the fluid through it.

20. The apparatus according to claim 1, wherein the apparatus comprises, inside the central body, a conversion system of mechanical energy into electric energy in which a turbine is connected to a system of magnets/coils and, while rotating, enables the production of electric current.

21. A method for determining the conditions of a pipeline and for analyzing the fluid contained therein, comprising the following steps:
providing an apparatus according to claim 1;
introducing said apparatus into a pipeline destined for transporting fluids for a monitoring operation;
collecting information and data on the conditions of the pipeline and the contained fluid during the monitoring operation;
extracting the apparatus from the pipeline and recovering from the apparatus the information and data collected during the monitoring operation;
analyzing the collected information and data to obtain indications on the conditions of the pipeline and on the contained fluid.

22. An apparatus for determining the conditions of a duct and for the analysis of the fluid contained therein, wherein said apparatus comprises:
a central body adapted to be inserted into a pipeline, prevalently made of plastic material, comprising a calibrated hole, which passes through it for the whole length, at least one salinity sensor and at least one pH measurement sensor, wherein said at least one salinity sensor and said at least one pH measurement sensor are positioned within the calibrated hole of the central body;
a first crown of petals connected to the central body, wherein each petal prevalently includes elastic polymeric material and extends from the central body until it touches the internal wall of the pipeline, each petal comprising at least one deformation sensor and at least one roughness sensor;
a sliding device which can be connected to the central body in a more advanced position with respect to the first crown, having such a form as to guarantee a direct and constant contact with the internal wall of the duct and a substantial alignment of the axis of the apparatus with that of the pipeline.

23. An apparatus for determining the conditions of a duct and for the analysis of the fluid contained therein, wherein said apparatus comprises:
a central body adapted to be inserted into a pipeline, prevalently made of plastic material, comprising a calibrated hole, which passes through it for the whole length, wherein the central body comprises at least a salinity sensor and at least a pH measurement sensor;
a first crown of petals connected to the central body, wherein each petal prevalently includes elastic polymeric material and extends from the central body until it touches the internal wall of the pipeline, each petal comprising at least one deformation sensor and at least one roughness sensor;
wherein the at least one deformation sensor are extensometers adhering to thin metal laminas positioned inside the petals;
wherein the at least one roughness sensor includes a probing tip, positioned on the end of the petal which is in contact with the internal wall of the pipeline, wherein said probing tip is connected to the thin metallic lamina provided with extensometers of the deformation sensor and wherein the information relating to the roughness is obtained by filtering the electric signal of the deformation sensor;
a sliding device which can be connected to the central body in a more advanced position with respect to the first crown, having such a form as to guarantee a direct and constant contact with the internal wall of the duct and a substantial alignment of the axis of the apparatus with that of the pipeline.

24. An apparatus for determining the conditions of a duct and for the analysis of the fluid contained therein, wherein said apparatus comprises:
- a central body adapted to be inserted into a pipeline, prevalently made of plastic material, comprising a calibrated hole, which passes through it for the whole length, wherein the central body comprises at least a salinity sensor and at least a pH measurement sensor;
- a first crown of petals connected to the central body, wherein each petal prevalently includes elastic polymeric material and extends from the central body until it touches the internal wall of the pipeline, each petal comprising at least one deformation sensor and at least one roughness sensor;
- a sliding device which can be connected to the central body in a more advanced position with respect to the first crown, having such a form as to guarantee a direct and constant contact with the internal wall of the duct and a substantial alignment of the axis of the apparatus with that of the pipeline;

wherein said sliding device is a second crown of petals having structural characteristics identical to the first crown of petals, or, otherwise, a foam pig made of an elastomeric or polymeric expanded material suitably perforated for providing accommodation of the central body;

wherein, when said sliding device is a foam pig, the apparatus comprises one or more crowns of petals identical to the first crown of petals, connected to the central body and in an offset position between each other with respect to the axis of the pipeline.

* * * * *